US005831741A

United States Patent [19]

Milillo

[11] Patent Number: 5,831,741

[45] Date of Patent: Nov. 3, 1998

[54] METHOD AND APPARATUS FOR DETECTING HOLES IN COPY MEDIA

[75] Inventor: William D. Milillo, Ontario, N.Y.

[73] Assignee: Xerox Corporation, Stamford, Conn.

[21] Appl. No.: 876,173

[22] Filed: Jun. 13, 1997

[51] Int. Cl.[6] ..................................................... G01N 21/84

[52] U.S. Cl. ............................................ 356/429; 356/431

[58] Field of Search .................................... 356/429–431; 750/559.12, 599.37, 599.4, 559.44, 559.42; 355/40.77, 29

[56] References Cited

U.S. PATENT DOCUMENTS

| | | | |
|---|---|---|---|
| 3,706,887 | 12/1972 | Bickford et al. | 250/219 DC |
| 4,130,756 | 12/1978 | Arndt et al. | 235/474 |
| 4,140,390 | 2/1979 | Schultheis et al. | 355/29 |
| 4,243,891 | 1/1981 | Dobler et al. | 250/559.42 |
| 4,296,332 | 10/1981 | Hill | 250/570 |
| 5,094,442 | 3/1992 | Kamprath et al. | 271/277 |
| 5,278,624 | 1/1994 | Kamprath et al. | 355/317 |
| 5,635,726 | 6/1997 | Zavislan et al. | 250/559.44 |

OTHER PUBLICATIONS

Strope et al., IBM Technical Disclosure Bulletin vol. 23, No. 9, Feb. 1981, pp. 4076–4077.

*Primary Examiner*—Robert Kim

[57] ABSTRACT

A copy media registration module for positioning paper in a feed path is disclosed. More specifically, the present invention is directed to a method and apparatus for detecting pre-drilled holes in copy media. A sensor detects the presence and absence of copy media in the feed path. Once a transition from paper to no-paper, or from no-paper to paper occurs, subsequent signals from the sensor are ignored for a designated period of time. At the leading edge of the sheet, this designated time period is chosen such that any possible holes will have moved past the sensor. At the trailing edge of the sheet, the designated time period is chosen based upon the maximum size of any holes that may be present.

18 Claims, 4 Drawing Sheets

METHOD AND APPARATUS FOR DETECTING HOLES IN COPY MEDIA

The present invention is directed to a method and apparatus for positioning paper in a feed path.

More specifically, the present invention is directed to a method and apparatus for detecting holes in copy media. The invention allows a registration system to distinguish between a hole and the leading or trailing edge of a copy sheet, to facilitate proper registration of the copy media onto a photoreceptor.

BACKGROUND OF THE INVENTION

The xerographic imaging process begins by charging a photoconductive member to a uniform potential, and then exposing a light image of an original document onto the surface of the photoconductor, either directly or via a digital image driven laser. Exposing the charged photoconductor to light selectively discharges areas of the surface while allowing other areas to remain unchanged, thereby producing an electrostatic latent image of the document on the surface of the photoconductive member. A developer material is then brought into contact with the surface of the photoconductor to transform the latent image into a visible reproduction. The developer material includes toner particles with an electrical polarity opposite that of the photoconductive member, causing them to be naturally drawn to it. A blank copy sheet or other type of copying media is brought into contact with the photoreceptor and the toner particles are transferred thereto by electrostatic charging the media. The copy media is subsequently heated, for permanent affixing of the reproduced image thereto to produce a "hard copy" reproduction of the document or image. The photoconductive member is then cleaned to remove any charge and/or residual developing material from its surface to prepare it for subsequent imaging cycles.

Blank copy media of a variety of sizes are typically stored in trays that are mounted at the side of the machine. In order to duplicate a document, copy media having the appropriate dimensions is transported from the tray into the paper path just ahead of the photoreceptor. The copy media is then brought in contact with the toner image that is present on the surface of the photoreceptor prior to transfer. If the copy media has not been oriented or registered properly before it is brought in contact with the toner image, the toner image may be fused at an improper location on the copy media, causing it to be skewed or too far up, down, front or back on the page.

Devices are presently available which provide for accurate copy media registration. For example, sensors may be strategically placed at the end the feed path, and their sequence of engagement used to determine whether a transporting copy sheet is skewed and/or laterally mis-aligned. If the sheet is skewed, the velocity of one side of the copy sheet is increased relative to the other side to return the sheet to proper alignment. If the sheet is laterally misaligned, the sheet is shifted to the proper lateral position. A device such as this is disclosed in U.S. Pat. No. 5,094,442 to Kamprath et al. issued Mar. 10, 1992, which discloses a translational electronic registration (TELER) system. This system generally includes three optical sensors, a pair of coaxial independently driven drive rolls, a carriage with a linear drive on which paper drive rolls are mounted, and a microprocessor controller. A blank copy media is driven into the nip rolls and moved through the paper path for placement and fusing of an image thereon. The speed of both nip rolls can be controlled to effect skew alignment and longitudinal registration. The nip rollers are mounted on a carriage movable transversely with respect to the feed path. A sensor system controls positioning of the carriage to achieve the desired top edge or a lateral positioning of the copy media. Independent control of nip roll drive and carriage translation provides simultaneous alignment in lateral and longitudinal directions. Copending application Ser. No. (concurrently filed, not yet assigned, our ref. D/97253) to Milillo et al. is another device that may be enhanced with the present invention.

It is often advantageous to feed copy media with predrilled holes through the path. Copy media of this type is useful when it is desired to place the printed copies into a looseleaf binder, or at other times when it becomes necessary to have output with punched holes. Problems arise, when copy media is transported through a system such as the one described above, because a hole passing over one of the sensors, causes the system to act as though the edge of the sheet is being detected. More specifically, the front edge of a hole appears to the system as the trailing edge (TE) of a sheet, and the back of a hole appears to be the leading edge (LE) of a sheet. This improper recognition of a hole as the edge of a sheet causes the system to correct misalignments that are not actually present, resulting in paper jams, and malfunctioning of the printing system. It is therefore advantageous to develop a way to detect pre-existing holes in copy media, and allow for continuous, accurate copy media registration.

The following disclosures may also be relevant to various aspects of the present invention:

U.S. Pat. No. 5,635,726 to Zavislan, et al. issued Jun. 3, 1997 discloses an electro-optical sensor which senses marks on a sheet that travels longitudinally with respect to a printed circuit board, carrying linear arrays of light sources (LEDs) and photodetectors and optics which define zones displaced laterally across the width of a sheet of paper, longitudinal columns of which can contain marks, the presence and absence of which marks is detected by the sensor. The sensor is especially adapted for use in detecting marks which indicate votes on paper ballots in electronic, computerized vote counting apparatus.

U.S. Pat. No. 5,278,624 to Kamprath et al. issued Jan. 11, 1994 discloses a differential drive registration system for copy sheets which uses a pair of drive rolls and a drive system for commonly driving both drive rolls. A differential drive mechanism changes the relative angular position of one of the rolls with respect to the other roll to deskew the copy sheet. A control system is supplied with inputs representative of the copy sheet and controls the differential drive mechanism to deskew the copy sheet.

U.S. Pat. No. 4,296,332 to Hill issued Oct. 20, 1981 discloses a sprocket hole sensing detector for moving translucent paper sheets, which includes a light emitting source and a light sensing device permanently fixed on one side of a moving object substantially separated one from the other. The light rays from the source are bent or reflected in a predetermined path so that the light rays to be sensed passes through at least two holes in the moving object before being sensed, thus enhancing the light to dark ratio and reducing the probability of false readings.

U.S. Pat. No. 4,130,756 to Arndt et al. issued Dec. 19, 1978 discloses a reader for badges having rows of data representative holes therethrough, the reader including a row of data reading photo-sensitive devices or the like for sensing light passing through a row of the badge holes, a stationary encoder bar having two rows of holes therethrough and a carriage movable with the badge as it is moved across the row of data reading devices for reading the holes in the badge and carrying a pair of control photosensitive devices for sensing light passing through the holes of the encoder bar.

U.S. Pat. No 3,706887 to Bickford et al. issued Dec. 19, 1972 discloses an optical card reader. The invention uses a discrete number of pulses to time the passage of column positions, samples hole data at four selected count positions and interrogates the samples to ascertain whether the condition of the samples indicates the presence or absence of data or an error condition. When valid data is sensed by data indications adjacent one end of the sample sequence, the interpreting circuit also indicates whether the presence of the hole occurred early or late with respect to nominal timing. In addition mark read data may be read at the same read station using selected samples that are interpreted as presence or absence of data or an error condition using the same interpreting circuitry.

Strope et al., IBM Technical Disclosure Bulletin Vol. 23, No. 9, February 1981, pp. 4076–4077, discloses an optical inspection system for inspecting printed circuit clearance holes to identify imperfections. Inspection is performed by scanning a linear array of charge-coupled photodiodes in conjunction with a data display and processor.

Copending application U.S. Ser. No. 08/728,028 to Borton et al. filed Oct. 7, 1996, entitled "Adaptive Sensor and Interface" discloses a multifunctional sensor that can detect the presence of substrates, including various opaque/translucent substrates as well as transparent substrates moving through a paper path. The sensor includes an LED disposed near the transporting path for projecting light toward a reflector on the opposite side of the media transport path and a phototransistor located relative to the LED and reflector to receive light reflected from the reflector which is periodically interrupted by substrates within the transporting path to provide an output proportional to the light received from the LED via the reflector. The operating range of the phototransistor has a linear portion and a saturated portion. A control, electrically connected to the sensor, adjusts the phototransistor to maintain the output signal in the linear portion of the operating range. The sensor is tilted at an angle with respect to the horizontal of a copy substrate to be able to detect transparencies.

All of the references cited herein are incorporated by reference for their teachings.

Accordingly, although known apparatus and processes are suitable for their intended purposes, a need remains for a method and apparatus capable of detecting pre-existing holes on copy media. An invention such as this increases the accuracy of registration of copy media at the end of a paper path. It can also be used to enhance operation of the associated imaging system.

SUMMARY OF THE INVENTION

In accordance with the present invention, there is provided an apparatus for detecting the presence of pre-existing holes in copy media, which includes a copy media transport for moving the copy media along a path; a registration system for placing the copy media at a designated location at an end of the path; a microprocessor, communicating with the registration system to adjust a location at which the copy media is placed at the path end; a light source, situated along the path; a light sensing device in a receiving relationship with the light source for sensing a light intensity from the light source, and generating signals indicative of the sensed light intensity, the sensed light intensity including a first signal when no light is sensed and a second signal when light is sensed; a detecting device for receiving the generated signals from the light sensing device, and for transmitting signals to a timing device at points at which generated signals transition between the first signal and the second signal; and a timing device which counts an amount of time that elapses after a transition has taken place, and transmits a timing signal to the microprocessor when a designated time period has elapsed.

In accordance with still another aspect of the invention there is provided a method of detecting preexisting holes in copy media, which includes measuring an amount of light reflected from a path along which the copy media travels, to determine when copy media is present; generating electronic signals in response to an amount of light measured; detecting transitions between signals generated when light is detected and signals generated when no light is generated; and ignoring the generated signals for a designated period of time after a transition is detected.

The present invention has a significant advantages over current methods of aligning copy media in a feed path in that it allows the presence of pre-drilled holes in copy media to be detected and insures more accurate alignment of such a copy sheet. In addition, it enables the imaging system to be able to track the presence of holes, to avoid printing over undesirable locations.

BRIEF DESCRIPTION OF THE DRAWINGS

Other features and advantages of the present invention will become apparent as the following description proceeds and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE PREFERRED EMBODIMENT

The present invention is directed to a method and apparatus for positioning paper in a feed path. Specifically the present invention relates to a method and apparatus detecting holes in copy media thereby allowing a registration system to distinguish between a hole and the leading or trailing edge of a copy sheet, to facilitate proper registration of the copy media onto a photoreceptor.

Figure 1:
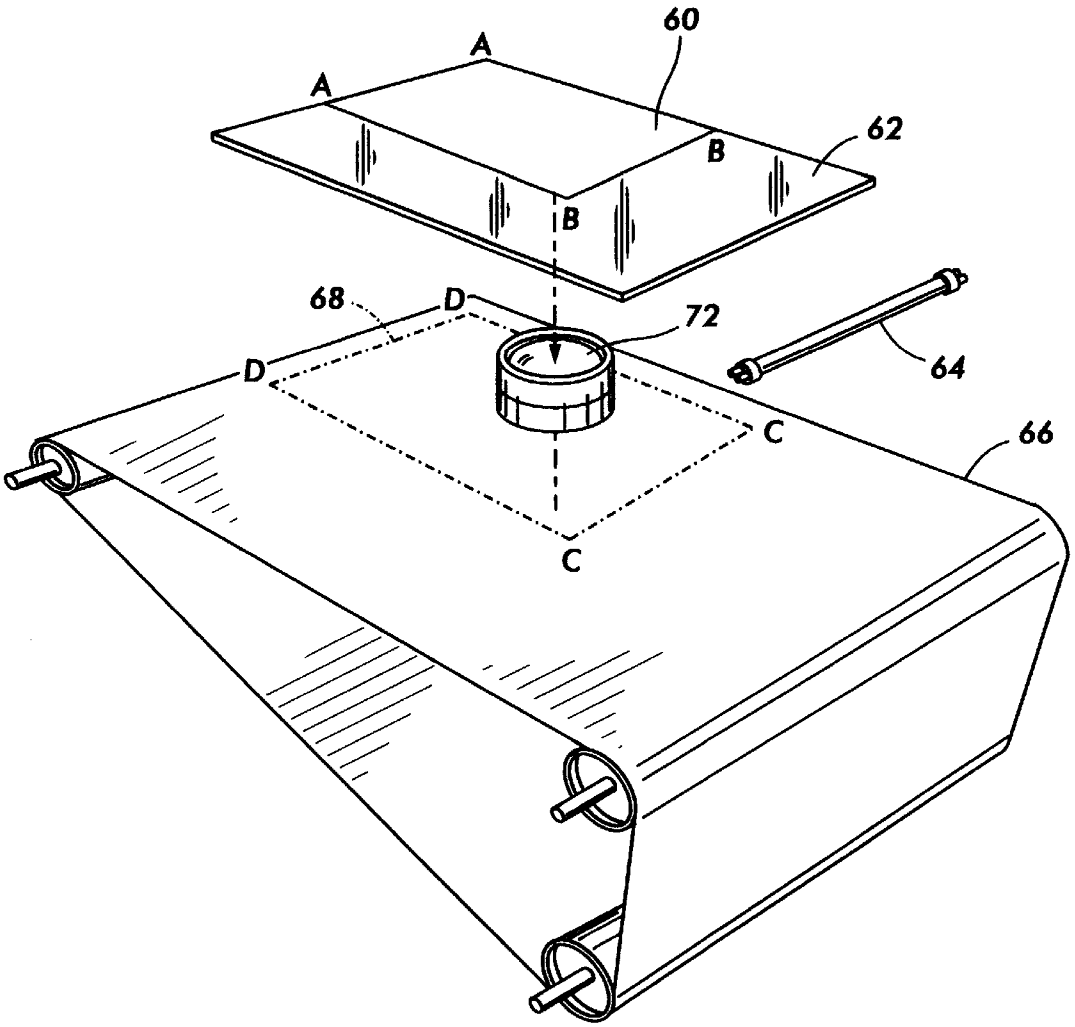
FIG. 1 depicts an isometric view of a possible layout of the interior of a xerographic copy machine. Relative positions of the platen glass, document, light source, lens, and photoreceptor are shown.

Referring now to the drawings where the showings are for the purpose of describing an embodiment of the invention and not for limiting same, FIG. 1 is used to illustrate an example light lens copying operation which begins by placing the document 60 face down upon the platen glass 62, such that the right edge of the original image is lined up with axis A. Axis B corresponds to the location at which the left edge of document 60 comes in contact with platen glass 62. It should be noted that the left edge of the image will rest at locations further away from or closer to axis A to axes B', B", etc. as documents with differing widths are used.

With continued reference to FIG. 1, document 60 is exposed to a light source 64, which causes the image thereon to be reflected back toward the copy machine and onto photoreceptor 66. Passage of the light reflected from document 60 through lens 72 causes latent image 68 projected onto photoreceptor 66 to be reversed such that the left edge of document 60 at axis A will be reflected at axis C on the photoreceptor belt. Thus, the left edge axis A of document 60 will become the trailing edge axis B of latent image 68, and will remain so throughout processing.

Figure 2:
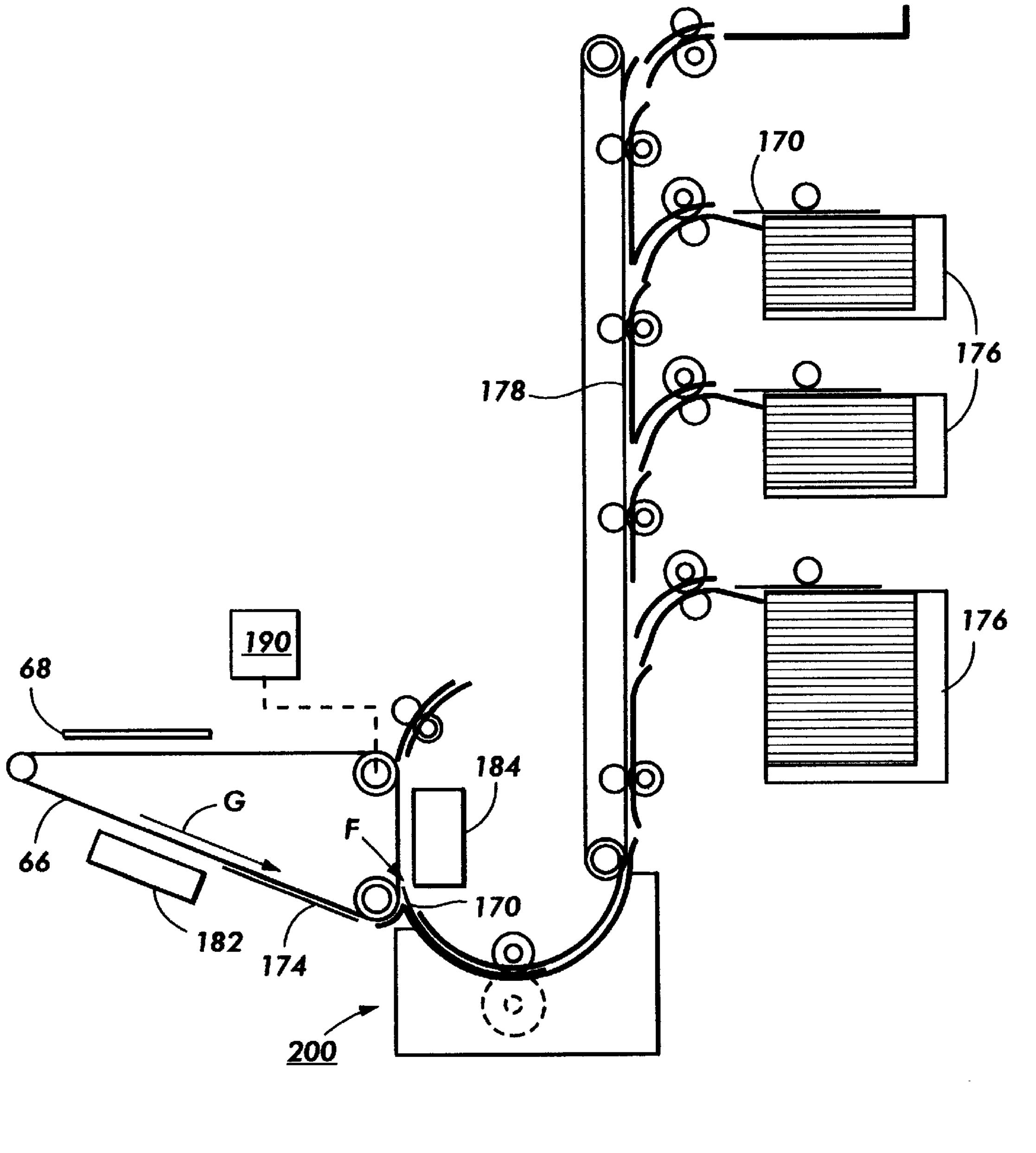
FIG. 2 shows a front view of an interior cavity of a photocopy machine. A photoreceptor is shown with latent and developed images shown thereon. The relative positions of the registration, development, transfer, and fusing stations are also shown. The paper path and media storage trays are also shown.

As shown in FIG. 2, once the latent image is generated, photoreceptor 66 will move latent image 68 in the direction of arrow G. Toner particles are deposited onto it at development station 182, thereby transforming latent image 68 into a developed image 174. Photoreceptor 66 and developed image 174 will then proceed toward transfer station 184.

Before developed image 174 reaches transfer station 184, a blank copy media 170 will be removed from one of paper trays 176 and transported along paper path 178. Copy media 170 will pass through nip 180 between two rolls included in registration system 200 end of paper path 178, to be placed in contact with developed image 174 just as it reaches transfer station 184. Copy media 170 with developed image 174 thereon will then move through a pre-fuser transport 186 (not shown) to fusing station 188 (not shown) where the toner image will be permanently affixed to copy media 70.

Figure 3:
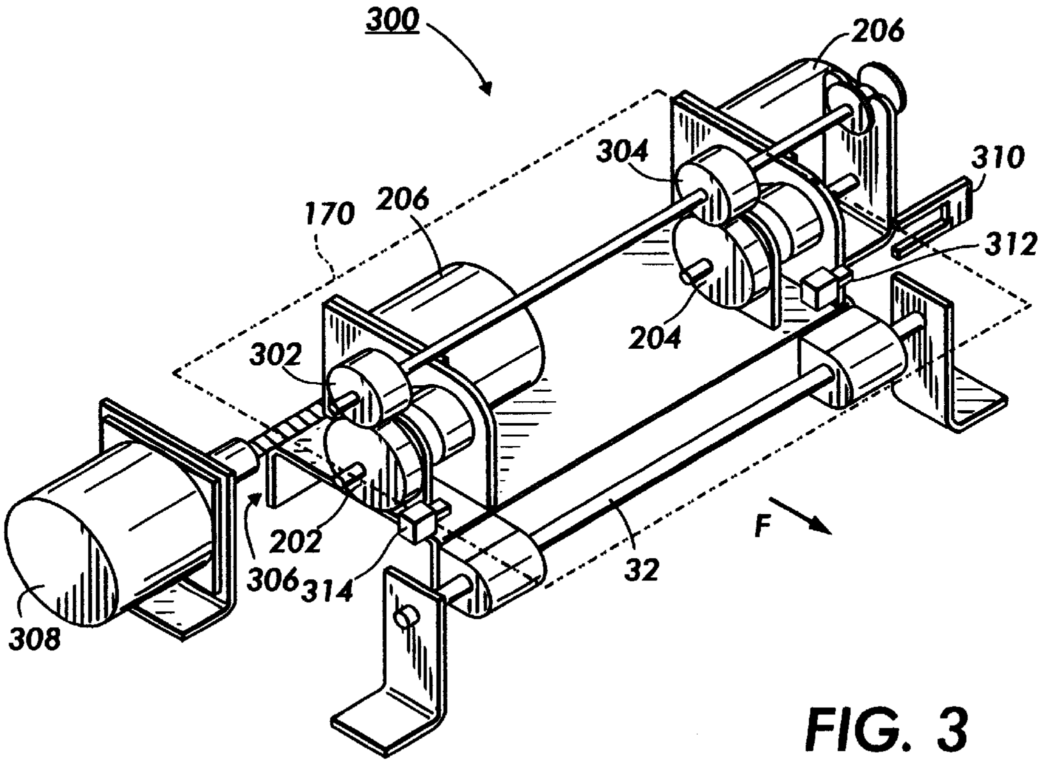
FIG. 3 contains an isometric view of a TELER system, one type of electronic drive roll system that may be used with the present invention.

While registration module 200 will operate successfully using a variety of types of drive roll systems, it will often include an electronic drive roll system, which is controlled by electronic signals that are transmitted from a microprocessor. One type of electronic drive roll system known to be very effective in accurately registering copy sheets is a translating electronic registration (TELER) system 300, illustrated in detail in FIG. 3. In the embodiment shown, TELER system 300 includes a carriage 306 having two drive rolls 202 and 204 which are mounted thereon in rotatable fashion, and are driven by drive motors 206. The roll pairs 202 and 302 engage copy media 170 and drive it through TELER system 300. The system includes optical sensors 312, 314 and 310 which will detect the presence of the edges of copy media 170. Two sensors 312 and 314 are mounted on the carriage 306 adjacent the drive rolls 202 for lead edge detection of the copy media and control of motors 206. The sequence of engagement of the sensors 312 and 314 and the amount of time between each detection is utilized to generate control signals for correcting skew (rotational mispositioning of the copy media about an axis perpendicular to the copy media) of the copy media by variation in the speed of drive rolls 202. Sensor 310 is arranged to detect the top edge of the copy media and the output therefrom is used to control transverse drive motor 308.

With reference now to FIG. 2, it is often advantageous to fill paper trays 176 with copy media 170 that has pre-drilled holes. The present invention includes a pre-drilled media algorithm which can be used to ensure proper registration of copy media 170 that has pre-drilled holes 402, best illustrated in FIG. 4.

Figure 4:
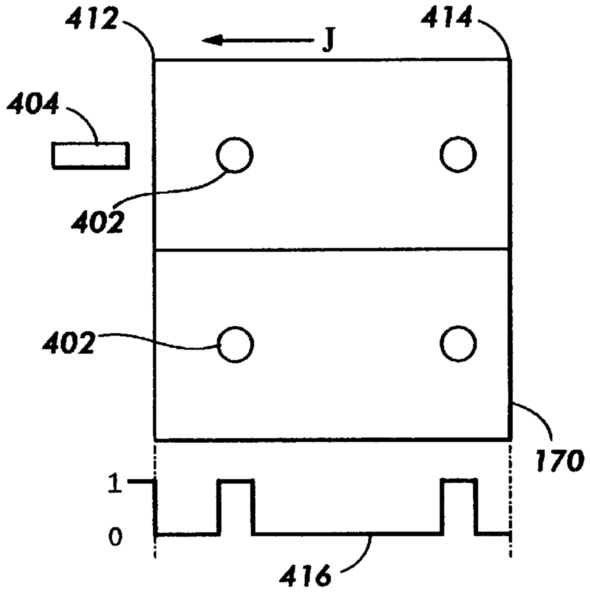
FIG. 4 depicts an example sheet of pre-drilled copy media that may be transported through the present invention.

As stated above, sensors can be used to detect the presence of copy media 170 in paper path 1 78 by measuring the amount of light that reaches a photodetector. These devices can also be used to detect the presence or absence of holes or slots in copy media 170. Referring now to FIG. 4, sensor 404 should be placed in paper path 178 such that copy media 170 moving through the paper path in the direction of arrow J can be detected. As copy media moves past sensor 404, electronic signals 416 are generated in response to the amount of light measured at the photodetector. A "no paper" signal (which may be either an ON/HI/1 signal or an OFF/LOW/0 signal depending upon the chosen configuration) is generated when light is being measured at the photodetector, indicating that a hole has been detected, while a "paper" signal (the signal opposite that chosen for the "no paper" signal) is generated while the solid portion of copy media 170 is being transported past sensor 404. However, a "no paper" signal will also be generated when there is no copy media moving past sensor 404, while an OFF signal will be generated when copy media is moving past sensor 404. Thus, capability which enables sensor 404 to discriminate between the leading edge 412 of a sheet and the back edge of a hole 402 upon receiving a transition from a no paper signal to a paper signal must be added. Similarly, sensor 404 must be able to distinguish the trailing edge 414 of copy media 170 from the front of a hole 402 when a transition from a paper signal to a no paper signal occurs.

Figure 5:
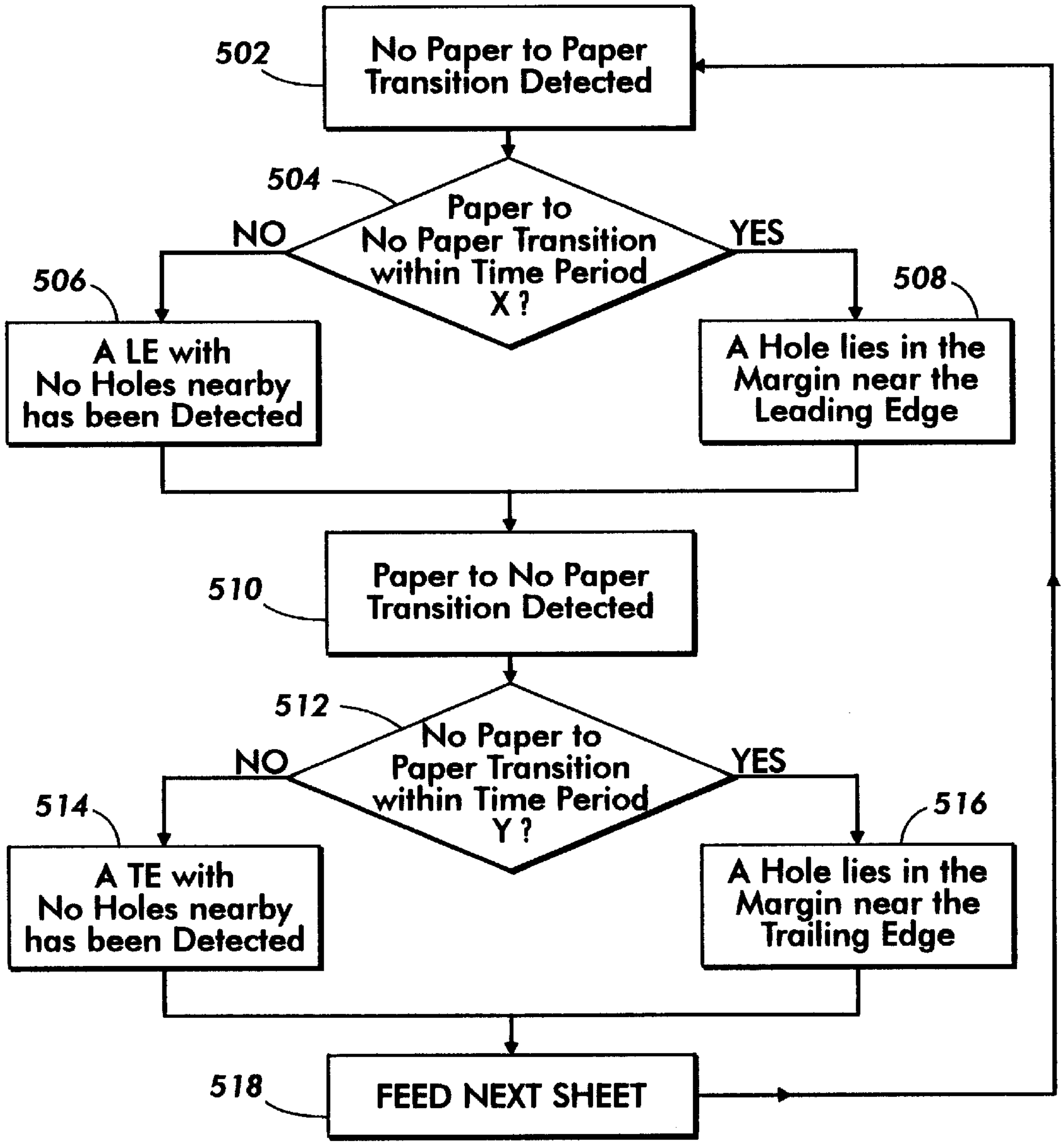
FIG. 5 contains a flow chart describing operation of a pre-drilled media algorithm that may be incorporated into the copy registration module of the present invention.

Referring now to FIG. 5, software can be incorporated into copy registration module 200 of the present invention in order to add this feature. As shown in the diagram, sensor 404 detects a transition from no paper to paper at block 502, indicating a leading edge (LE) of a sheet of new copy media 170, or the back of a hole 402 is passing sensor 404. After the no paper to paper signal is received, signals are ignored for a designated period of time. The length of this designated time period must be chosen by considering the speed of the copy machine, and the possible locations of any holes that might be present in copy media.

Quite often, holes in copy media lie within ¾ in. from the leading edge. However, it is not unusual for holes to lie further from the leading edge, or for consecutive holes to be placed next to each other, such that there is at least one hole further than 3/4 inch from the leading edge. On the other hand, it is rare that a hole will lie in or near the middle of a page. Thus, the designated time period must simply be long enough to allow the leading edge of the copy media to pass a comfortable distance away from sensor 404, so that it will be clear that the sensor is reading light reflected from the center of the copy media. More specifically, the length of time that should elapse once a no paper to paper signal transition occurs should be determined by dividing the distance the copy media must travel to ensure that no holes will be present, by the velocity of the sheet as it passes over the sensing device. In one embodiment of the invention, the speed of copy media 170 as it enters nip 180 is known to be 1000 mm/s, while it is known that no holes will lie more than 100 mm from the leading edge of copy media 170. In this embodiment, the designated time period is approximately 100 ms.

With continued reference to FIG. 5, if a paper to no paper signal transition has not occurred within the designated time period, a LE with no holes has been detected by sensor 404 as shown in block 506. On the other hand, a transition from a paper signal to a no paper signal within the designated time period X indicates that a hole lies within the allocated distance from the LE of copy media 170, as indicated in block 508. An electronic registration system cannot function properly without a mechanism which accurately detects the leading and trailing edges of copy media. Information about the location of pre-existing holes can also be used by the imaging system of the printing machine to shift the location of the image so information will not be printed over a hole in the copy media.

Similarly, the presence of holes at the trailing edge (TE) of a copy sheet must also be detected, however the process for detecting holes at this end of the page must be slightly different. First, this consideration is being made while a paper signal is already being transmitted from sensor 404. Once a paper to no paper transition occurs as indicated in block 510, the sensor must determine whether or not subsequent no paper to paper transition occurs within a designated time period y as indicated in block 512. Again, this time period must be altered as print speed and hold diameter are changed. However, the length of the time period is chosen by considering the speed of the copy machine, and the largest possible diameter size for any holes that might be present in copy media. This is because it is impossible to simply select an appropriate distance for which it is certain that a no paper to paper transition which follows a paper to no paper transition will mean that the trailing edge of copy media 170 is being sensed, rather than the back of a hole on a subsequent copy sheet. Thus, the designated time period is chosen by considering the largest possible diameter of a hole that will lie near the trailing edge of the copy media. Once the speed at which the copy media 170 exits nip 180 is known, the designated time period should be equal to the amount of time that it will take for the diameter distance to move past the sensor at the known copy speed. In the embodiment described above, it is also known that no holes larger than 10 mm will ever be present on a page. It is also known that the speed of exiting speed of copy media 170 is 480 mm/s. Under these circumstances 20 ms is the approximate time period that will elapse. If a no paper to paper transition does not occur within the given time period, the TE of copy media 170 has been detected as indicated in block 514. the presence of a no paper to paper signal transition indicates that a hole lies in the margin next to the trailing edge of the page as shown in block 516.

The system can automatically be reset as another sheet of copy media 170 is fed from paper tray 176. The information regarding the presence or absence of holes in the margins of copy media 170 can be used for many purposes, including transmitting signals to the imaging system in order to prevent the latent image from being generated in locations on photoreceptor 66 that will correspond to areas on copy media 170 that will contain holes. Also the use of sensors to accurately detect copy media edges is critical to the functioning of an electronic registration system.

The above subsystems are merely examples of the types of enhancements that may be added to copy registration module 200 of the present invention. Any or all of them may be added or removed from the module at a single time. It will also be possible to add other enhancements which have not been mentioned here.

It is, therefore, apparent that there has been provided in accordance with the present invention, a copy media registration module that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. An apparatus for distinguishing between edges and pre-existing holes in copy media, comprising:

a) a copy media transport for moving the copy media along a path;

b) a registration system for placing the copy media at a designated location at an end of said path;

c) a microprocessor, communicating with said registration system to adjust a location at which the copy media is placed at said path end;

d) a light source, situated along said path;

e) a light sensing device in a receiving relationship with said light source for sensing a light intensity from said light source, and generating signals indicative of said sensed light intensity, said sensed light intensity including a first signal when no light is sensed and a second signal when light is sensed; and f) a detecting device for receiving said generated signals from said light sensing device, and for transmitting signals to a timing device at points at which generated signals transition between said first signal and said second signal;

g) a timing device which counts an amount of time that elapses after a transition has taken place, and transmits a timing signal to said microprocessor when a designated time period has elapsed, wherein said microprocessor determines, based on said timing signal, whether said transition is a leading edge of said copy media, or a hole located in said copy media wherein said designated time period is dependent upon a speed of copy media as it enters said registration system, and a distance from a trailing edge of the copy media for which it is known that holes will be present.

2. An apparatus for detecting the presence of pre-existing holes as claimed in claim 1, wherein said first signal is generated when the copy media blocks light emitted from said light source and prevents said emitted light from reaching said light sensing device, and said second signal is generated when the copy media is not located between said light source and said light sensing device.

3. An apparatus for detecting the presence of pre-existing holes as claimed in claim 1 wherein said designated time period is determined by dividing said a distance along said copy media speed by said copy media velocity.

4. An apparatus for detecting the presence of pre-existing holes as claimed in claim 1 wherein said designated time period is dependent upon a speed of copy media as it exits said registration system, and a diameter of a largest hole that will potentially be present upon the copy media.

5. An apparatus for detecting the presence of pre-existing holes as claimed in claim 4 wherein said designated time period is determined by dividing said diameter by said copy media velocity.

6. An apparatus for detecting the presence of pre-existing holes as claimed in claim 1, wherein said registration is an electronic registration system.

7. An apparatus for detecting the presence of pre-existing holes as claimed in claim 7 wherein said electronic registration system is a translating electronic registration system.

8. An apparatus for detecting the presence of pre-existing holes as claimed in claim 1 wherein said light source is an LED disposed near said feed path for projecting light toward said feed path.

9. An apparatus for detecting the presence of pre-existing holes as claimed in claim 1 wherein said light sensing device is a phototransistor.

10. A method of [detecting] distinguishing between edges and pre-existing holes in copy media, comprising:

a) measuring an amount of light reflected from a path along which the copy media travels, to determine when copy media is present;

b) generating electronic signals in response to an amount of light measured;

c) detecting transitions between signals generated when light is detected and signals generated when no light is generated; and d) ignoring said generated signals for a designated period of time after a transition is detected, thereby determining whether said transition was a leading edge of said coy media, a trailing edge of said copy media or a hole located in said copy media wherein said designated time period is dependent upon a speed of copy media as it enters said registration system, and a distance from a trailing edge of the copy media for which it is known that holes will be present.

11. A method for detecting the presence of pre-existing holes as claimed in claim 10, wherein said first signal is generated when the copy media blocks light emitted from said light source and prevents said emitted light from reaching said light sensing device, and said second signal is generated when the copy media is not located between said light source and said light sensing device.

12. A method for detecting the presence of pre-existing holes as claimed in claim 10 wherein said designated time period is determined by dividing said leading edge distance by said copy media velocity.

13. A method for detecting the presence of pre-existing holes as claimed in claim 10 wherein said designated time period is dependent upon a speed of copy media as it exits said registration system, and a diameter of a largest hole that will potentially be present upon the copy media.

14. A method for detecting the presence of pre-existing holes as claimed in claim 13, wherein said designated time period is determined by dividing said diameter by copy media velocity over said designated distance said diameter.

15. A method for detecting the presence of pre-existing holes as claimed in claim 10, wherein said registration is an electronic registration system.

16. A method for detecting the presence of pre-existing holes as claimed in claim 15 wherein said electronic registration system is a translating electronic registration system.

17. A method for detecting the presence of pre-existing holes as claimed in claim 10 wherein said light source is an LED disposed near said feed path for projecting light toward said feed path.

18. A method for detecting the presence of pre-existing holes as claimed in claim 10 wherein said light sensing device is a phototransistor.

* * * * *